United States Patent
Andersson

(10) Patent No.: US 9,003,472 B2
(45) Date of Patent: Apr. 7, 2015

(54) METHOD AND ARRANGEMENT FOR SHARING MEDIA CONTENT

(75) Inventor: Ola Andersson, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/391,639

(22) PCT Filed: Sep. 17, 2009

(86) PCT No.: PCT/SE2009/051035
§ 371 (c)(1),
(2), (4) Date: Feb. 22, 2012

(87) PCT Pub. No.: WO2011/034474
PCT Pub. Date: Mar. 24, 2011

(65) Prior Publication Data
US 2012/0151529 A1 Jun. 14, 2012

(51) Int. Cl.
*H04N 7/16* (2011.01)
*H04N 7/18* (2006.01)
*H04N 7/173* (2011.01)
*H04N 21/2743* (2011.01)
*H04N 21/4788* (2011.01)

(52) U.S. Cl.
CPC ....... *H04N 21/2743* (2013.01); *H04N 21/4788* (2013.01)

(58) Field of Classification Search
CPC .................. H04N 21/2743; H04N 21/4788
See application file for complete search history.

(56) References Cited

U.S. PATENT DOCUMENTS

| | | | |
|---|---|---|---|
| 7,028,096 B1 * | 4/2006 | Lee | 709/231 |
| 7,313,755 B2 | 12/2007 | Rahman et al. | |
| 7,460,546 B2 * | 12/2008 | Anderson, IV | 370/401 |
| 2002/0162109 A1 * | 10/2002 | Shteyn | 725/87 |
| 2006/0136964 A1 * | 6/2006 | Diez et al. | 725/37 |
| 2007/0199019 A1 | 8/2007 | Angiolillo et al. | |
| 2008/0222689 A1 | 9/2008 | Howcroft et al. | |
| 2008/0263591 A1 * | 10/2008 | de Heer | 725/38 |

(Continued)

FOREIGN PATENT DOCUMENTS

| | | |
|---|---|---|
| CN | 1465189 A | 12/2003 |
| CN | 101164055 A | 4/2008 |

(Continued)

OTHER PUBLICATIONS

International Search Report for PCT/SE2009/051035, mailed May 24, 2010.

(Continued)

*Primary Examiner* — Rong Le
(74) *Attorney, Agent, or Firm* — Nixon & Vanderhye, P.C.

(57) ABSTRACT

Method and arrangements for providing personal media content of a first user (A) to a device used by a second user (B). A personal TV channel is created (1:1) for the first user as a program with media content by an IPTV portal (100) in a device used by the first user. The created personal TV channel is published (1:2) and stored (1:3) at an IPTV server (104) serving the first and second users. Then, the personal TV channel is introduced (1:7) as an available channel in an electronic program guide (EPG) provided by the IPTV server to the device (104) of the second user. When the second user selects the personal TV channel from his/her electronic program guide, the program with media content is delivered (1:8) from the IPTV server to the second users device.

14 Claims, 5 Drawing Sheets

(56) References Cited

U.S. PATENT DOCUMENTS

2009/0193469 A1* 7/2009 Igarashi .................. 725/56
2009/0254959 A1 10/2009 Blackwell

FOREIGN PATENT DOCUMENTS

| | | | |
|---|---|---|---|
| CN | 101322109 | A | 12/2008 |
| CN | 101422043 | A | 4/2009 |
| CN | 101459682 | A | 6/2009 |
| CN | 101467458 | A | 6/2009 |
| EP | 2 000 917 | A1 | 12/2008 |
| EP | 2 091 182 | | 8/2009 |
| JP | 2008-118468 | A | 5/2008 |
| WO | WO 2008109539 | | 9/2008 |
| WO | WO 2008109539 | A2 * | 9/2008 |

OTHER PUBLICATIONS

Written Opinion for PCT/SE2009/051035, mailed May 24, 2010.
Written Opinion for PCT/SE2009/051035, mailed Nov. 28, 2011.
Supplementary EP Search Report mailed Jul. 9, 2014 in EP application 09849598.
Chinese Search Report mailed Jun. 4, 2014 in Chinese application 200980161568.9.

* cited by examiner

US 9,003,472 B2

METHOD AND ARRANGEMENT FOR SHARING MEDIA CONTENT

This application is the U.S. national phase of International Application No. PCT/SE2009/051035 filed 17 Sep. 2009 which designated the U.S., the entire contents of which is hereby incorporated by reference.

TECHNICAL FIELD

The invention relates generally to a method and arrangement for enabling one device user to share media content with other device users in a convenient manner.

BACKGROUND

A functionality called DLNA (Digital Living Network Alliance) has been developed for communication of media between communication devices in a limited local network environment, also referred to as a residential or office network, LAN (Local Area Network), private or home network. In this description, the term "local network" represents any such networks. The local devices that may occur in a local network environment include fixed and wireless telephones, stationary PC:s, portable laptops, media players, game units, servers and television boxes, the latter also called "STB" (Set Top Box).

The so-called UPnP (Universal Plug-and-Play) protocol is typically utilised by DLNA-enabled devices for communication of media content within the local network. DLNA will be further extended to also allow for media communication with entities outside the local network. However, most TV sets used today will not be upgraded for internal DLNA communication for some time, and it will take even longer before external DLNA communication is possible.

In recent years, it has become very popular for users in telecommunication networks to make personal media content, such as photos and home videos, available to other users by publishing the content on a central server which can basically be searched and accessed over the Internet by the other users. Some examples of such Internet based services for media sharing are "Flickr" for photos and "YouTube" for videos. Many network operators also provide similar services for their subscribers. The user thus uploads his/her personal media content to the central server where it is stored for others to search and retrieve. Various mechanisms are typically also employed for controlling access to the media in order to allow only certain users to download the personal media content from the central server.

However, since most users have their personal media originally stored in a home environment, it is necessary to register with a media sharing service and explicitly upload the content from a local home storage, e.g. a PC, over the Internet to a central media server. This operation may be perceived as cumbersome or unsafe, and consequently many users are reluctant to share their media by means of such Internet based media sharing services. Moreover, the uploaded content may become outdated and in that case the user will need to explicitly upload new content once again. If not, the content stored on the central server will remain outdated, which is generally an undesirable situation.

Another drawback associated with the above-described method of media sharing, is that many users are likewise reluctant to search and download personal media over the Internet and play it out on their equipment used for the downloading, which may be considered unsatisfactory, cumbersome or unsafe. For example, the receiving user may prefer to display visual media on a large TV screen or play music content on a hi-fi system, in order to enjoy far better quality than offered by the Internet-enabled device used for downloading, typically a PC or an Internet-enabled telephone. The user may thus not always be able or willing to transfer the media to such a preferred device.

It can also be said generally that using Internet services for media consumption is far from fully employed by users, particularly elderly people. Thus, films and videos are still watched mostly in front of the living room TV set which is however not used for downloading media over the Internet. The above drawbacks and difficulties with the current mechanisms for media sharing result in missed sharing of potentially interesting or desirable personal media content for the users, as well as missed business opportunities for network operators.

SUMMARY

It is an object of the invention to basically address at least some of the problems and issues discussed above. Further, it is an object to enable the sharing of media content between users in a fairly safe and convenient manner. These objects and others may be obtained by providing a method and arrangements according to the independent claims attached below.

According to one aspect, a method is defined for providing personal media content of a first user to a device used by a second user. In this method, a personal TV channel is created for the first user as a program with media content, by an IPTV portal in a device used by the first user. The created personal TV channel is stored at an IPTV server serving the first and second users. The personal TV channel is then introduced as an available channel in an electronic program guide provided by the IPTV server to the device of the second user, and the program with media content is delivered from the IPTV server to the device of the second user when selecting the personal TV channel from the electronic program guide. By this solution, media can be shared by means of the IPTV service which many users already have and is also generally regarded as a safe and convenient way of watching TV. Furthermore, the watching users do not need to search and download the personal media content over the Internet.

According to another aspect, an arrangement is provided in an IPTV portal configured to operate in a device used by a first user to provide personal media content of the first user to a device used by a second user. According to this arrangement, the IPTV portal comprises a channel creating unit adapted to create a personal TV channel composed of media content, and a publishing unit adapted to publish the created personal TV channel in an IPTV server serving the first and second users. Thereby, the IPTV server is enabled to introduce the personal TV channel as an available channel in an electronic program guide provided by the IPTV server to the device of the second user, and to deliver the program with media content to the device of the second user when selecting the personal TV channel from the electronic program guide.

According to another aspect, an arrangement is provided in an IPTV server serving a first user and a second user, and configured to provide personal media content of the first user to a device used by the second user. According to this arrangement, the IPTV server comprises a receiving unit adapted to receive from an IPTV portal in a device used by the first user, a publication of a personal TV channel created for the first user as a program with media content, and to obtain and store the media content in a media storage accessible for the IPTV server. The IPTV server further comprises an electronic program guide unit adapted to introduce the personal TV channel as an available channel in an electronic program guide provided by the IPTV server to the device of the second user. The IPTV server also comprises a channel delivering unit adapted to deliver the program with media content to the device of the second user when selecting the personal TV channel from the electronic program guide. Thereby, the second user can easily find and watch the personal TV channel just like any other channel or program delivered by the IPTV service.

According to another aspect, an arrangement is provided in a home gateway in a local network that comprises a device used by a first user and at least one further local device in which media is stored, wherein the device of the first user has an IPTV portal configured to provide personal media content of the first user to a device used by a second user outside the local network. According to this arrangement, the home gateway comprises a receiving unit adapted to receive an upload request from an IPTV server for different media items in a personal TV channel created for the first user as a program with media content, the IPTV server serving the first and second users. The home gateway also comprises a fetching unit adapted to fetch the media items from the at least one further local device according to the upload request, and an uploading unit adapted to upload the media items to the IPTV server.

Thereby, the IPTV server is enabled to introduce the personal TV channel as an available channel in an electronic program guide provided by the IPTV server to the device of the second user, and to deliver the program with media content to the device of the second user when selecting the personal TV channel from the electronic program guide. The first user is also able to compose the personal TV channel with media content from other devices in the local network, thus not limited to the device of the first user.

Different embodiments are possible in the method and arrangements above.

In one embodiment, the IPTV server obtains the media content in the personal TV channel from the device having the IPTV portal of the first user, which is useful, e.g., when the first user is not connected to a local network and thus no home gateway is available. In another embodiment, different media items in the personal TV channel are obtained from different local devices in a local network of the first user. In the latter case, the IPTV portal of the first user may send metadata of the personal TV channel to the IPTV server, which comprises references to the media items in the personal TV channel, and the IPTV server can use the metadata to obtain the media items from the local devices. Thereby, the first user is not limited to media stored in his/her own device. The media items may further be collected from the local devices and stored in a local storage at the device used by the first user.

In another embodiment, a home gateway in the local network fetches the media items in the personal TV channel from the local devices and uploads the media items to the IPTV server. The home gateway may also monitor the media items in the local devices for any changes, and when a media item is changed, it uploads the new media item to the IPTV server to update the personal TV channel.

In other possible embodiments, the IPTV portal of the first user presents a preview of the created personal TV channel, and the IPTV portal of the first user may further provide a TV channel template which can be used by the first user to create the personal TV channel. The personal TV channel with personal media content can be stored in a media storage of the IPTV server.

In another embodiment, the IPTV server sends an invitation to an IPTV portal in the device of the second user for receiving the personal TV channel, and indicates the personal TV channel in the electronic program guide of the second user in response to an acceptance message from the second user containing a physical channel to be used for the personal TV channel.

Further possible features and benefits of the invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

Briefly described, a first user who wants to share personal media with a second user can do so by creating his/her own TV channel composed as a program with any freely selected personal media content, which is stored at an IPTV server controlled by an IPTV provider serving the first and second users. It is assumed that the first and second users use TV enabled devices. Furthermore, an IPTV portal with new functionality installed in a suitable communication device, such as a PC or STB, is used by the first user to create the TV channel. The consuming second user is then able to receive that TV channel from the IPTV server just like any public TV channel, i.e. without having to search and download the media content from a public media server over the Internet. The first user can also avoid the above-described Internet based media sharing services and rely on the IPTV service instead.

A TV channel composed as a program with personal media content will in this description be referred to as a "personal TV channel". Further, the personal media content in the personal TV channel may comprise any media items such as home-made videos, photos, animations, music or other audio items. The present solution is thus not limited to any particular types of media and/or content. In this description, the term "user" is also used in a logical sense and may in practice be one or more persons, e.g. a family, an organisation or other group of people.

In this solution, the personal channel is presented to a consuming user by introducing it as an available channel in that user's program and channel presentation means normally provided by the IPTV server, which will be referred to as an Electronic Program Guide EPG in the following description. The consuming user will thus see the personal TV channel of the first user as a selectable channel, amongst other selectable public TV channels, displayed in the EPG. Optionally, the second user may first be invited to add the personal TV channel to his/her EPG, or it may be added automatically to the EPG.

Figure 1:
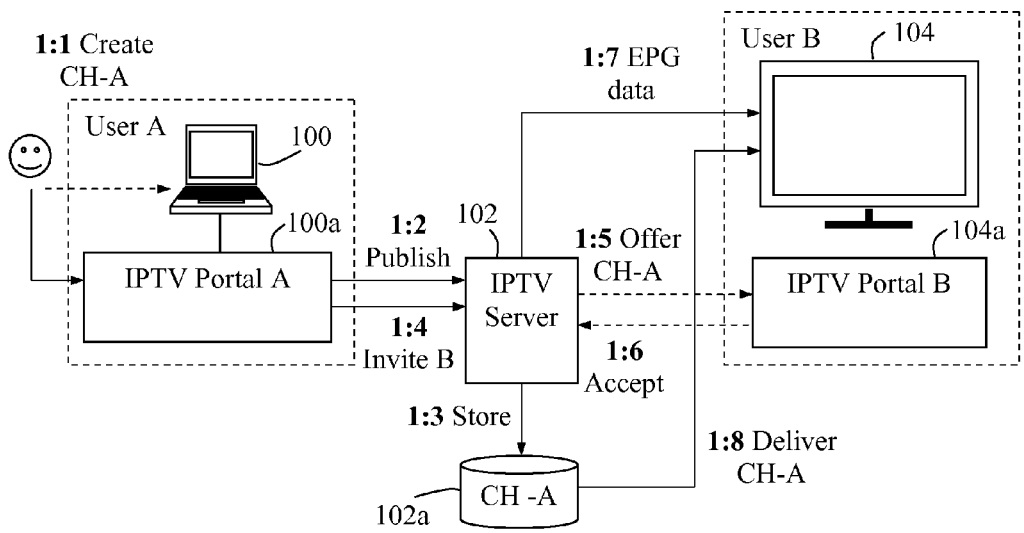
FIG. 1 is a schematic block diagram illustrating an IPTV system where a device user can share media content with another user, in accordance with one exemplary embodiment.

An exemplary procedure and IPTV system where a first device user A can convey his/her personal media content to a second device user B, will now be described with reference to the communication scenario shown in FIG. 1. It is assumed that both users have IPTV enabled devices. In this example, user A operates a PC device 100 having an IPTV portal 100a adapted to interact with user A and communicate with an IPTV server 102 as follows. User B operates a TV set 104 likewise having an IPTV portal 104a. Further, the IPTV server is controlled by an IPTV provider serving the first and second users A, B.

In a first step 1:1, a personal TV channel composed as a program with personal media content, is created in the IPTV portal 100a in response to input commands from user A. In this step, IPTV portal 100a may provide a suitable TV channel template which is used by the first user as a framework to create the personal TV channel. Further, the IPTV portal 100a may present an editing screen allowing user A to activate the TV channel template, select media items to include in the personal TV channel, and configure the personal TV channel in any desired manner. The personal TV channel created by user A is denoted "CH-A".

Configuring the personal TV channel may include arranging the selected media items as a program along a "timeline", i.e. a sequence schedule, and making various settings which could include transition effects between media items and time schedule settings for the program in the channel. Thus, it may be configured that the program shall start at a specific time and be "aired" just once, or that a program, or block of programs, is repeated at specific times or on a continuous basis, etc. Furthermore, user A may also set a mapping of the personal TV channel to a physical channel, which corresponds to a channel position in his/her own EPG, if desired. However, the present invention is not limited to any specific settings or configuration parameters for the personal TV channel.

The created personal TV channel CH-A will effectively serve as a logical container for the media items. In this example, the media items are being stored and selected from the PC device 100 itself, although other storage locations for the media items may be possible as well which will be described in the next example shown in FIG. 2.

In a next step 1:2, user A has completed creation of the personal TV channel CH-A and activates the IPTV portal 100a to publish it at the IPTV server 102. In this step, IPTV portal 100a thus sends the personal TV channel, including all settings, configuration parameters and selected media items therein, to the IPTV server 102. Alternatively in this step, IPTV portal 100a may send references to the media items enabling the IPTV server 102 to fetch them from the PC device 100.

The IPTV server 102 then stores the personal TV channel with its media items in a central media storage 102a, in a following step 1:3. The IPTV server 102 may store a plurality of such personal TV channels with media items for multiple users in the central storage 102a, to be delivered to various consuming users. The media storage 102a may also be used for storing any public TV programs for delivery according to the IPTV service.

In a next step 1:4, user A activates the IPTV portal 100a to send an invitation message to IPTV server 102 which invites user B to be a receiver of his/her created and published personal TV channel. The IPTV server 102 then sends an invitation to the IPTV portal 104a of user B as an offer to receive and consume channel CH-A, in a further step 1:5. In this case, user B accepts the offer of CH-A and activates IPTV portal 104a to return a suitable accept message back to the IPTV server 102, in a next step 1:6. This response message should also contain a physical channel to which the personal TV channel should be mapped, which thus corresponds to a channel position in user B's EPG. Alternatively, a default physical channel and corresponding channel position in the EPG may be used.

Then, the IPTV server 102 introduces the personal TV channel CH-A as an available channel in his/her regular EPG which is generally provided by the IPTV server 102 to the TV device 104 of user B, by sending corresponding EPG data to device 104 in a step 1:7. Thereby, user B will be able to see channel CH-A as a selectable channel displayed in his/her EPG scheme amongst other selectable public TV channels. All user B has to do then is select channel CH-A from the EPG, which will be delivered from storage 102a to the TV device 104 for display in a conventional manner, as shown in a final step 1:8.

Alternatively, the IPTV server 102 may introduce the personal TV channel CH-A as an available channel in the EPG of user B automatically, that is without first inviting him/her to receive it, such that steps 1:5 and 1:6 can be omitted. The user B can then watch the channel by selection from the EPG. Using the normal functions of the IPTV service, channel CH-A is delivered to device 104 upon demand, i.e. when the user selects it from the EPG.

As mentioned above, the example in FIG. 1 assumes that all media items of channel CH-A are retrieved locally in the device 100 used by user A and where the IPTV portal 100a is running, a PC in this case. Another exemplary procedure and IPTV system where a personal TV channel CH-A of a first user A can be made available to a second user B, where channel CH-A contains media items from plural devices in a local network, will now be described with reference to FIG. 2.

In this example, user A thus operates a device, not shown, in a local network 200 with plural local devices which are connected to a home gateway 202 arranged for communication outside the local network 200. An IPTV portal 204 in the device of user A is adapted to interact with user A, an IPTV server 206 and the home gateway 202, the latter further being configured to communicate with the IPTV server 206, as follows. Also in this case, the IPTV server 206 is controlled by an IPTV provider serving both users A and B. Comparing with the example shown in FIG. 1, steps 1:1-1:3 therein are now replaced by the procedure shown in FIG. 2, while the following steps 1:4-1:8 may be basically the same in this example as well and are therefore omitted in FIG. 2.

In a first step 2:1, user A activates the IPTV portal 204 to execute a discovery process in the local network 200 in order to find and select media items for the personal TV channel, which in this context can be seen as a search for media in the local network. Device discovery is a process which is normally performed whenever a new device enters a local network, involving the exchange of device capabilities and available media items stored in the different local devices. The discovery process in this case basically means that home gateway 202 sends information to the IPTV portal 204 regarding what media items are available in the local devices, enabling the user to browse the various media storages in the network 200 when looking for content to use in his/her TV channel.

The discovery of media may be done in different ways depending on the implementation of the local network 200, and any of the following alternatives may be valid: 1) For a DLNA type network, the device of user A could just list all available media storages and items for the user to select, based on information from the home gateway 202. 2) The home gateway 202 may contain functionality for sharing this type of information even for non-DLNA devices. 3) Media stored locally in the device where the IPTV portal 204 is running, e.g. an STB or PC, could be accessed directly by the IPTV portal 204.

A next step 2:2 illustrates that the IPTV portal 100a creates the personal TV channel CH-A composed as a program with selected media items, in response to input commands from user A. The selected media items are thus being stored in different local devices, in this example shown as a PC, a media server and a hard disc drive. In the channel CH-A, references to the selected media items are specified in a channel framework or the like, while an editing screen and TV channel template may be used and settings may be made in the manner described above for FIG. 1.

A further optional step 2.3 illustrates that the selected media items may also be collected from the local devices and stored in a local storage 204a at the device running the IPTV portal 204. Thereby, the IPTV portal 204 is able to obtain the duration of the channel CH-A and its individual media items, and to present a preview for user A of the program in the channel CH-A.

In response to an input command from user A, the IPTV portal 204 publishes channel CH-A at the IPTV server 102 by sending metadata of the personal TV channel, including all settings, configuration parameters and also references to the selected media items therein, to the IPTV server 206 in a next step 2:4. In this step, the IPTV portal 204 may also send user credentials to the IPTV server which identify and authorise user A to publish the channel CH-A. This metadata is maintained in the IPTV server 504 for use when delivering the channel CH-A to a consuming user at a later point.

In a further step 2:5, the IPTV server 206 sends an upload request for the media items to the home gateway 202, using the previously received media item references which thus points to the different storages in the local devices. This request also includes the destination of a central media storage 206a accessible for the IPTV server 206 and where the channel CH-A with its media items are to be stored.

In response to the upload request, the home gateway 202 fetches the referenced media items from the local devices in a step 2:6, and eventually uploads them to the destined storage 206a according to the upload request, in a further step 2:7. Then, any further user outside the local network may be invited to receive the personal TV channel, and it may be introduced in the user's EPG and delivered accordingly when selected, basically according to the procedure described above for steps 1:4-1:8 which is not necessary to described here again.

After creating and publishing the personal TV channel with one or more media items, any of the media items may be changed in some way. For example, user A may add new pictures to an image folder residing in one of the local devices, or remove pictures therefrom. According to one possible embodiment, the home gateway 202 may monitor the media items in the local devices for any changes, e.g. by frequently checking the latest modification date of a folder containing one or more of the media items of the channel, or of a corresponding file or the like. When a media item change is detected, e.g. when media is added, removed or modified, the home gateway 202 updates the channel CH-A in the media storage 206a, e.g. by uploading a new media item to storage 206a, which will be described in more detail later below.

Figure 2:
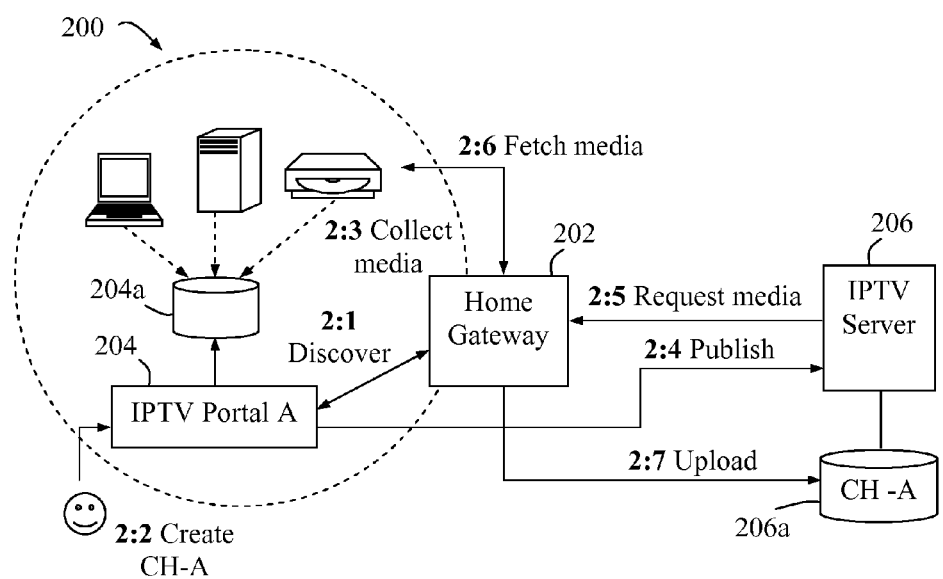
FIG. 2 is a schematic block diagram illustrating another IPTV system where a device user in a local network can share media content with another user outside the local network, in accordance with another exemplary embodiment.

In the example described for FIG. 2, the home gateway 202 is involved to enable user A to browse for media within the local network 200, and may be further used to synchronise the media content in the personal TV channel between user A and the IPTV server 206 according to the change monitoring procedure above.

Figure 3:
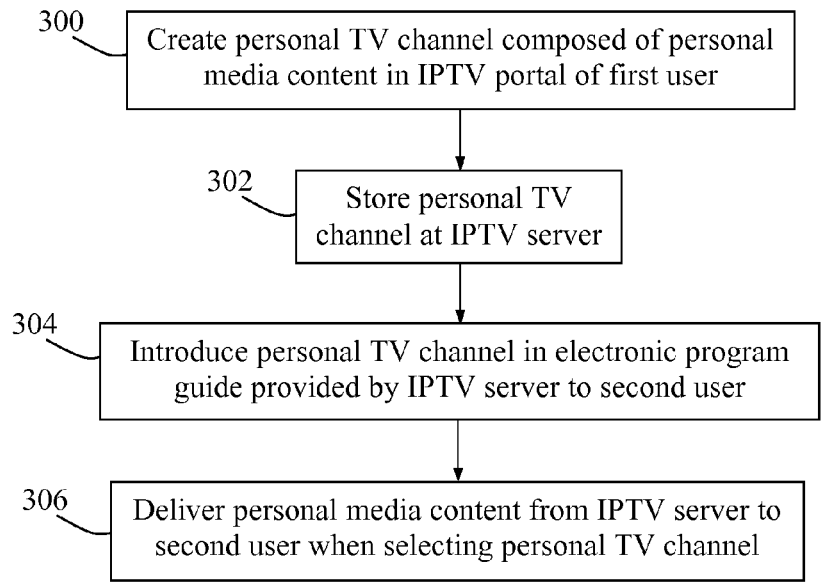
FIG. 3 is a flow chart illustrating a procedure for sharing media content as a personal TV channel, in accordance with another embodiment.

A procedure for providing personal media content of a first user to a device used by a second user, will now be described with reference to the flow chart in FIG. 3. In a first step 300, a personal TV channel is created for the first user as a program with personal media content, which is executed by an IPTV portal in a device used by the first user. In a next step 302, the created personal TV channel is stored at an IPTV server controlled by an IPTV provider serving the first and second users. This step can be seen as the equivalent of publishing the personal TV channel, i.e. making it available for other users of IPTV-enabled devices such as the second user in this example.

The IPTV server then introduces the personal TV channel as an available channel in an electronic program guide EPG provided by the IPTV server to the device of the second user, in a further step 304. Finally, The IPTV server delivers the personal media content from the IPTV server to the device of the second user, in a step 306, when that user selects the personal TV channel from the EPG.

Figure 4:
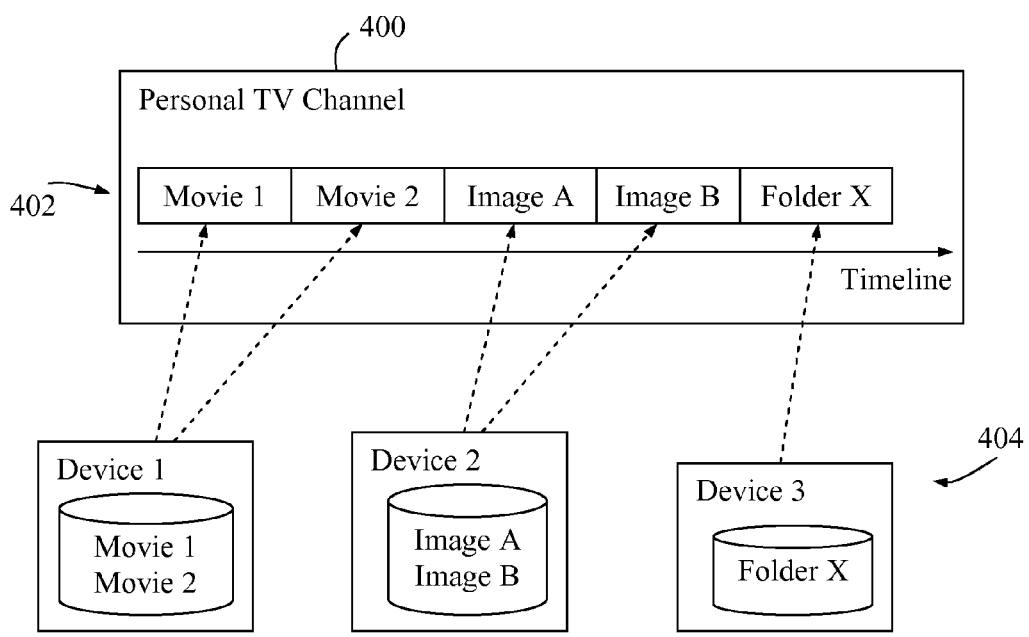
FIG. 4 is a schematic illustration of how a personal TV channel can be composed of different media items, in accordance with another embodiment.

As mentioned above, creating the personal TV channel may include arranging media items as a program along a timeline, and the media items may have been selected from different local devices in a local network. FIG. 4 illustrates schematically an example of how a personal TV channel 400 can be composed of different media items 402 residing in three different devices 404.

Thus, the program starts with two movies 1 and 2 both being stored in device 1 which could be a media server. Then, two images A and B will be displayed with a present duration, i.e. in a "slideshow" manner, both being stored in device 2 which could be a PC. Finally, the contents of a folder X, e.g. comprising any number of media items such as videos, images or animations, are displayed to complete the program in the personal TV channel 400. The folder X is stored in device 3 which could be a media drive.

Figure 5:
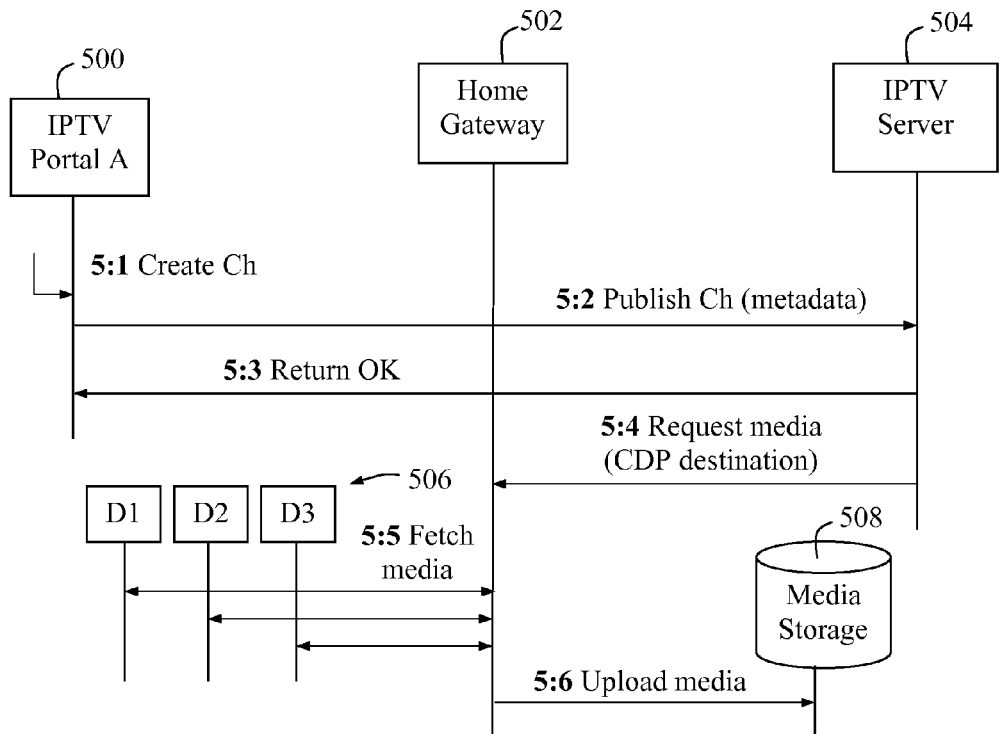
FIG. 5 is a first signalling diagram illustrating how a first device user can create a personal TV channel, in accordance with another embodiment.

An exemplary procedure of how a first device user A in a local network can create and publish a personal TV channel using an IPTV portal, will now be described with reference to the first signalling diagram in FIG. 5. In this example, User A operates a device having the IPTV portal 500 and the local network includes a home gateway 502 and at least three local devices 506 denoted D1-D3, further involving a central IPTV server 504 being connected to a media storage 508.

In a first step 5:1, the IPTV portal 500 receives input commands from user A and creates the personal TV channel Ch composed as a program with media items which the user has selected from the three local devices 506, basically as in step 2:2 in FIG. 2. Then, IPTV portal 500 sends a publishing message to the IPTV server 504, in a next step 5:2, basically as in step 2:4 in FIG. 2. The publishing message thus contains metadata of the personal TV channel, including various settings and configuration parameters and also references to the selected media items being stored in devices 506. This publishing message may also include user credentials, as also mentioned for the examples above. At least the channel settings and configuration parameters are maintained in the IPTV server 504 for later delivery. The IPTV server 504 also responds with a suitable acknowledging message back to IPTV portal 500 in a next step 5:3.

Next, the IPTV server 504 sends an upload request to home gateway 502 referring to the previously received references to the selected media items and a CPD destination, in a further step 5:4, basically as in step 2:5 in FIG. 2. The home gateway 502 then fetches media items from the devices 506 in the local network in a following step 5:5, basically as in step 2:6 in FIG. 2. Finally, home gateway 502 uploads the configured TV channel and fetched media items to the media storage 508 according to the upload request, in a step 5:6, basically as in step 2:7 in FIG. 2.

Figure 6:
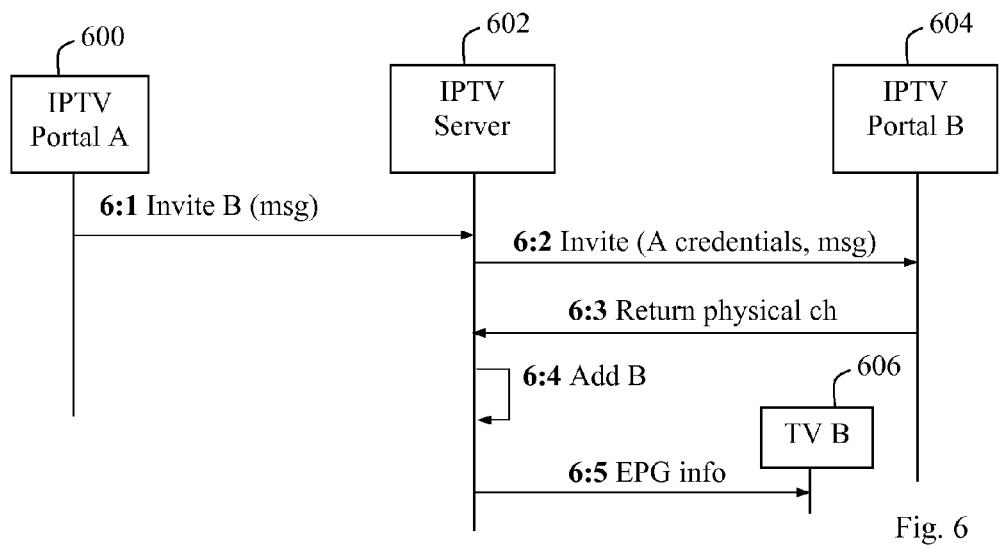
FIG. 6 is a second signalling diagram illustrating how a second device user can get a personal TV channel that has been created for the first device user, in accordance with another embodiment.

As mentioned above, a consuming user may first be invited to receive a personal TV channel. An exemplary procedure of how a second device user B can receive a personal TV channel that was created by a first device user A, will now be described with reference to the second signalling diagram in FIG. 6, which basically corresponds to steps 1:5-1:7 in FIG. 1 as described above. An IPTV portal 600 of user A sends an invitation message to an IPTV server 602 in a first step 6:1, which basically invites user B to receive the personal TV channel. In this invitation message, user A may also include some personal note (msg) directed to user B, e.g. "Hi, here are some pictures from the ski trip". Although only one user is invited in this example, it is also possible to invite multiple users simultaneously in the invitation message.

IPTV server 602 then sends the invitation message, optionally also including credentials of user A, to an IPTV portal 604 in a TV device 606 used by user B, in a next step 6:2. If user A has invited more than one user, IPTV server 602 would send this invitation to each invited user, i.e. to their IPTV portals. In response thereto, and if user B accepts the invitation to receive A's personal TV channel, the IPTV portal 604 of B returns a physical channel selected by user B to IPTV server 602, in a step 6:3, to which A's personal TV channel shall be mapped to create a position in B's EPG.

IPTV server 602 then registers user B as a consuming user that shall receive A's personal TV channel, in a further step 6:4. Thus, IPTV server 602 may maintain a list of such consuming users, to which user B is now added. Finally, IPTV server 602 sends EPG data to the TV device 606 of user B, in a last shown step 6:5, thereby introducing A's personal TV channel as an available channel in B's EPG.

Figure 7:
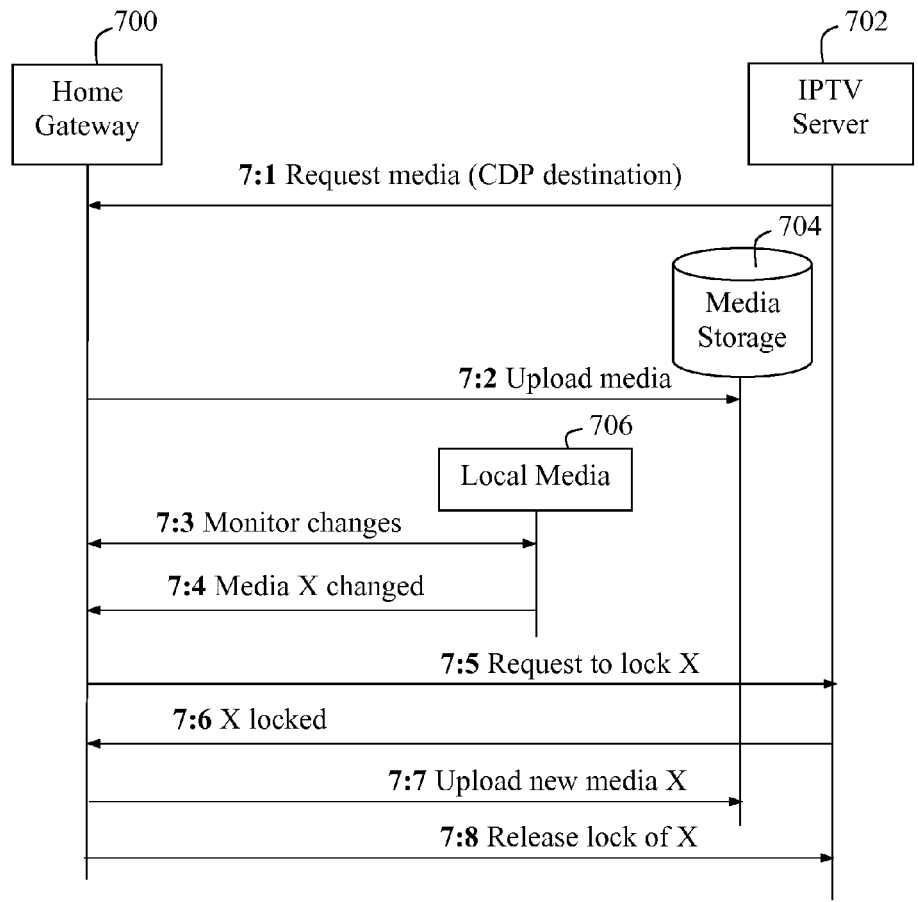
FIG. 7 is a third signalling diagram illustrating how a personal TV channel can be modified when a media item is changed, in accordance with another embodiment.

As mentioned above for the case when media items in a personal TV channel are stored in plural local devices, the home gateway may update the channel when a media item change is detected. An exemplary procedure of how a personal TV channel can be modified when a media item therein is changed, will now be described with reference to the third signalling diagram in FIG. 7 involving a home gateway 700 of a local network, a central IPTV server 702 and its media storage 704. It is assumed that the personal TV channel has been created and published, e.g. in the manner described for steps 2:2-2:4 in FIG. 2, or steps 5:1-5:3 in FIG. 5.

The first steps 7:1 and 7:2 illustrate that IPTV server 702 sends an upload request to home gateway 700, which then accordingly uploads the relevant media items to the media storage 704, respectively. These steps thus basically correspond to steps 5:4 and 5:6 in FIG. 5. In a next step 7:3, the home gateway 700 monitors the media items of the personal TV channel stored locally in the devices in the local network, in the figure indicated as "local media 706" for simplicity, for any changes such as addition, deletion or modification of any media item. The home gateway then detects in a step 7:4 that a media item "X" has been changed, e.g. by checking the latest modification date of a corresponding file or folder holding the media X.

In a further step 7:5, the home gateway 700 sends a request to IPTV server 702 to lock the media X in the media storage 704 to prevent any further delivery to consuming users, until the media X has been updated. IPTV server 702 may also acknowledge that media X has been locked, in a step 7:6. The home gateway 700 then fetches the changed media X from the local device where it is stored, not shown, and uploads the new media X to the storage 704, in a following step 7:7. The home gateway 700 also sends a release message to IPTV server 702 to release the lock of media X, in a final step 7:8.

Some possible arrangements in an IPTV portal and an IPTV server, respectively, will now be described in more detail with reference to the block diagram in FIG. 8, which may be used in any of the above-described procedures and embodiments.

An IPTV portal 800 is configured to operate in a device used by a first user A to provide personal media content of user A to a device used by a second user. The IPTV portal 800 comprises a channel creating unit 800a adapted to create a personal TV channel composed of media content, and a publishing unit 800b adapted to publish the created personal TV channel in an IPTV server 802 controlled by an IPTV provider serving the first and second users. Thereby, the IPTV server is enabled to introduce the personal TV channel as an available channel in an electronic program guide provided by the IPTV server to the device of the second user, and to deliver the program with media content to the device of the second user when selecting the personal TV channel from the electronic program guide.

The IPTV server 802 is also basically configured to provide personal media content of the first user A to a device used by the second user. IPTV server 802 comprises a receiving unit 802a adapted to receive from IPTV portal 800 a publication of the personal TV channel Ch created for the first user as a program with media content, and to obtain and store the media content MC in a media storage 802b accessible for the IPTV server. IPTV server 802 further comprises an electronic program guide unit 802c adapted to introduce the personal TV channel as an available channel in an electronic program guide EPG provided by the IPTV server to the device of the second user, and a channel delivering unit 802d adapted to deliver the program with media content to the device of the second user when selecting the personal TV channel from the electronic program guide.

The receiving unit 802a may be further adapted to receive metadata of the personal TV channel from the IPTV portal of the first user, the metadata comprising references to the media items in the personal TV channel. The IPTV server 802 may then be adapted to use the metadata to obtain the media items from the local devices.

The IPTV server 802 may also be adapted to send an invitation to an IPTV portal in the device of the second user for receiving the personal TV channel, and the electronic program guide unit 802c may further be adapted to introduce the personal TV channel in the electronic program guide of the second user in response to an acceptance message from the second user containing a physical channel to be used for the personal TV channel.

A possible arrangement in a home gateway will now be described in more detail with reference to the block diagram in FIG. 9, which may be used in the above-described procedures and embodiments for the case of a local network, e.g. as described for FIGS. 2, 4, 5 and 7. The home gateway 900 thus belongs to a local network that comprises a device used by a first user, not shown, and at least one further local device 902 in which media is stored, wherein the device of the first user has an IPTV portal configured, as in the examples described above, to provide personal media content of the first user to a device used by a second user outside the local network.

The home gateway 900 comprises a receiving unit 900a adapted to receive an upload request UR from an IPTV server 904 for different media items in a personal TV channel created for the first user as a program with media content. The IPTV server is controlled by an IPTV provider serving the first and second users. The home gateway 900 further comprises a fetching unit 900b adapted to fetch the media items M from the at least one further local device 902 according to the upload request, and an uploading unit 900c adapted to upload the media items M to the IPTV server 904, i.e. to a media storage 906 of the IPTV server 904. Thereby, the IPTV server is enabled to introduce the personal TV channel as an available channel in an electronic program guide provided by the IPTV server to the device of the second user, and to deliver the program with media content to the device of the second user when selecting the personal TV channel from the electronic program guide.

The home gateway may further be adapted to monitor the media items in the local devices for any changes, and when a media item is changed, to upload the new media item to the IPTV server. It has been described in more detail above, with reference to FIG. 7, how the home gateway can update the personal TV channel when a media item change is detected.

Figure 8:
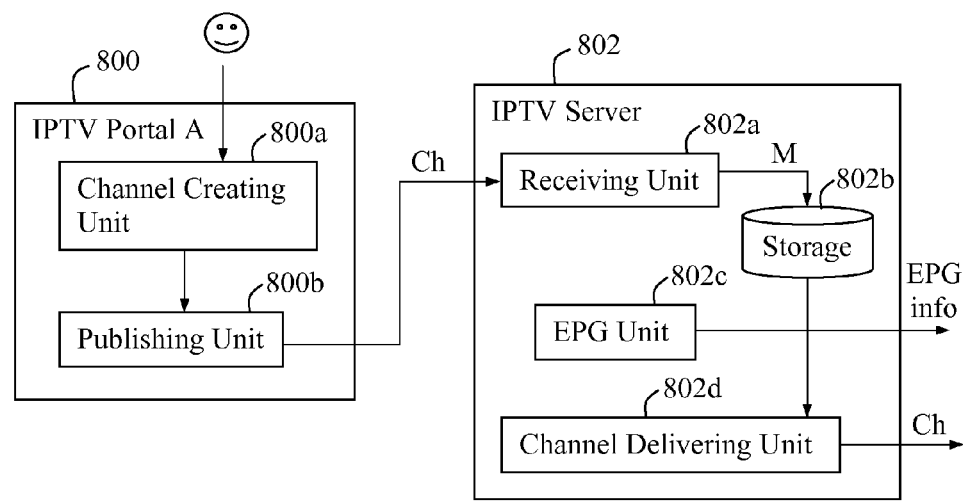
FIG. 8 is a block diagram illustrating an IPTV portal in a user device and an IPTV server in more detail, in accordance with further possible embodiments.
Figure 9:
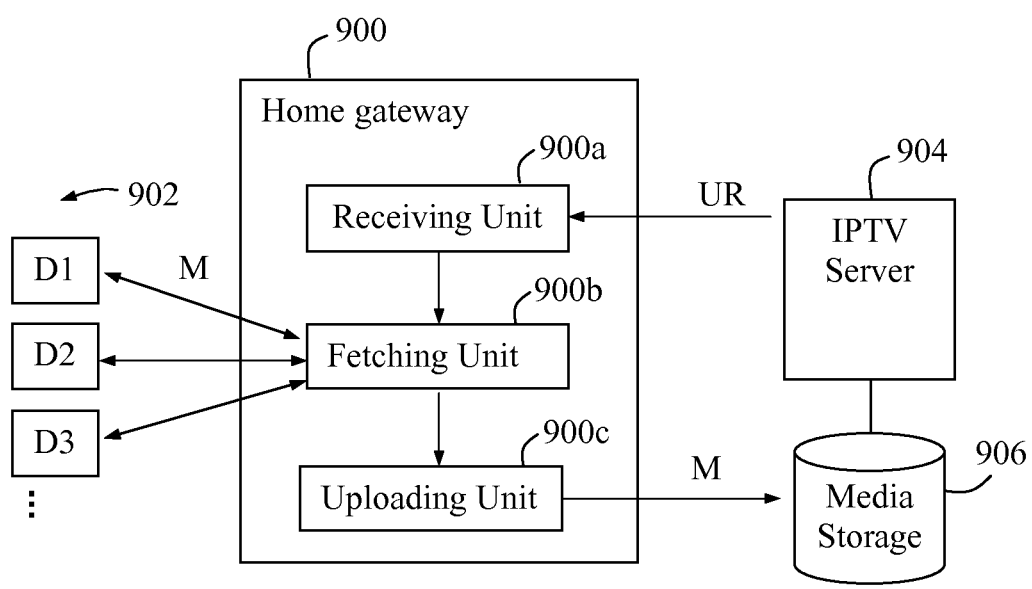
FIG. 9 is a block diagram illustrating a home gateway of a local network in more detail, in accordance with another possible embodiment.

It should be noted that FIGS. 8 and 9 merely illustrates various functional units in the IPTV portal 800, IPTV server 802 and home gateway 900 in a logical sense, although the skilled person is free to implement these functions in practice using any suitable software and hardware means. Thus, the invention is generally not limited to the shown structure of the IPTV portal 800, IPTV server 802 and home gateway 900, respectively, while their functional units may be configured to operate according to the methods and procedures described above for FIGS. 1-7, where appropriate.

While the invention has been described with reference to specific exemplary embodiments, the description is only intended to illustrate how this solution can be realised in practice and should not be taken as limiting the invention. For example, the terms "EPG", "device", "home gateway", "IPTV portal" and "IPTV server" have been used throughout this description, although any other corresponding functions, nodes and units may be used having the functionalities described here. The invention is generally defined by the following independent claims.

The invention claimed is:

1. A method of providing personal media content of a first user to a device used by a second user, the method comprising:
creating a personal TV channel for the first user as a program with media content by an IPTV portal in a device used by the first user;
storing the created personal TV channel at an IPTV server serving the first and second users;
introducing said personal TV channel as an available channel in an electronic program guide (EPG) provided by the IPTV server to the device of the second user; and
delivering the program with media content from the IPTV server to the device of the second user when selecting the personal TV channel from said electronic program guide, wherein
different media items in the personal TV channel are obtained from different local devices in a local network of the first user,
the IPTV portal of the first user sends metadata of the personal TV channel to the IPTV server, said metadata comprising references to the media items in the personal TV channel, and
the IPTV server uses said metadata to obtain the media items from the local devices,
wherein a home gateway in the local network fetches the media items from the local devices and uploads the media items to the IPTV server, and wherein the home gateway monitors the media items in the local devices for any changes, and when a media item is changed, uploads the changed media item to the IPTV server.

2. A method according to claim 1, wherein the obtaining of the media items includes collecting said media items from the local devices and storing in a local storage at the device used by the first user.

3. A method according to claim 1, wherein the IPTV portal of the first user presents a preview of the created personal TV channel.

4. A method according to claim 1, wherein the IPTV portal of the first user provides a TV channel template which is used by the first user to create the personal TV channel.

5. A method according to claim 1, wherein the personal TV channel with personal media content is stored in a media storage of the IPTV server.

6. A method according to claim 1, wherein the IPTV server sends an invitation to an IPTV portal in the device of the second user for receiving the personal TV channel, and indicates the personal TV channel in the electronic program guide of the second user in response to an acceptance message from the second user containing a physical channel to be used for the personal TV channel.

7. The method of claim 1, wherein the metadata comprises references pointing to storage locations of the media items in the local devices.

8. An arrangement in an IPTV portal operating in a device used by a first user to provide personal media content of the first user to a device used by a second user, comprising:
a channel creating unit creating a personal TV channel composed of media content, and
a publishing unit publishing the created personal TV channel in an IPTV server serving the first and second users, thereby enabling the IPTV server to introduce the personal TV channel as an available channel in an electronic program guide provided by the IPTV server to the device of the second user, and to deliver the program with media content to the device of the second user when selecting the personal TV channel from said electronic program guide,
wherein the IPTV portal sends metadata of the personal TV channel to the IPTV server, said metadata comprising references to different media items in the personal TV channel obtained from different local devices in a local network of the first user, enabling the IPTV server to use said metadata to obtain the media items from the local devices,
wherein a home gateway in the local network fetches the media items from the local devices and uploads the media items to the IPTV server, and wherein the home gateway monitors the media items in the local devices for any changes, and when a media item is changed, uploads the changed media item to the IPTV server.

9. An arrangement according to claim 8, wherein the IPTV portal presents a preview of the created personal TV channel.

10. An arrangement according to claim 8, wherein the IPTV portal provides a TV channel template which is used by the first user to create the personal TV channel.

11. An arrangement according to claim 8, wherein the devices of the first and second users are IPTV enabled devices.

12. An arrangement in an IPTV server serving a first user and a second user, and providing personal media content of the first user to a device used by the second user, comprising:
- a receiving unit receiving from an IPTV portal in a device used by the first user, a publication of a personal TV channel created for the first user as a program with media content, and obtaining and storing the media content in a media storage accessible for the IPTV server,
- an electronic program guide unit introducing said personal TV channel as an available channel in an electronic program guide (EPG) provided by the IPTV server to the device of the second user, and
- a channel delivering unit delivering the program with media content to the device of the second user when selecting the personal TV channel from said electronic program guide, wherein
- different media items in the personal TV channel are obtained from different local devices in a local network of the first user,
- the receiving unit further receives metadata of the personal TV channel from the IPTV portal of the first user, said metadata comprising references to the media items in the personal TV channel, and
- the IPTV server uses said metadata to obtain the media items from the local devices,
- wherein the home gateway monitors the media items in the local devices for any changes, and when a media item is changed, uploads the changed media item to the IPTV server.

13. An arrangement according to claim 12, wherein the IPTV server sends an invitation to an IPTV portal in the device of the second user for receiving the personal TV channel, and the electronic program guide unit introduces the personal TV channel in the electronic program guide of the second user in response to an acceptance message from the second user containing a physical channel to be used for the personal TV channel.

14. An arrangement in a home gateway in a local network that comprises a device used by a first user and at least one further local device in which media is stored, wherein the device of the first user has an IPTV portal providing personal media content of the first user to a device used by a second user outside the local network, the home gateway comprising:
- a receiving unit receiving an upload request from an IPTV server for different media items in a personal TV channel created for the first user as a program with media content, said IPTV server serving the first and second users, and the upload request including metadata comprising references pointing to the at least one local device storing the different media items,
- a fetching unit fetching media items from the at least one further local device according to the metadata in the upload request, and
- an uploading unit uploading the media items to the IPTV server,
- thereby enabling the IPTV server to introduce the personal TV channel as an available channel in an electronic program guide provided by the IPTV server to the device of the second user, and to deliver the program with media content to the device of the second user when selecting the personal TV channel from said electronic program guide,
- wherein the home gateway monitors the media items in the local devices for any changes, and when a media item is changed, uploads the changed media item to the IPTV server.

* * * * *